(12) United States Patent
Kurihara et al.

(10) Patent No.: US 9,288,443 B2
(45) Date of Patent: Mar. 15, 2016

(54) BROADCAST CONTENT DISTRIBUTION SYSTEM, AND DISTRIBUTION APPARATUS AND BROADCAST RECEPTION TERMINAL DEVICE FOR USE IN THE SYSTEM

(75) Inventors: Shinichi Kurihara, Yokohama (JP); Yoshiro Osaki, Kawasaki (JP); Sunao Wada, Yokohama (JP); Kiyoshi Yamaguchi, Hino (JP); Naoko Satoh, Hachioji (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 617 days.

(21) Appl. No.: 12/185,424

(22) Filed: Aug. 4, 2008

(65) Prior Publication Data

US 2009/0077596 A1    Mar. 19, 2009

(30) Foreign Application Priority Data

Sep. 18, 2007   (JP) .................. 2007-241491

(51) Int. Cl.
*H04N 7/173*   (2011.01)
*H04N 21/231*  (2011.01)
*H04N 21/24*   (2011.01)
(Continued)

(52) U.S. Cl.
CPC ........... *H04N 7/17318* (2013.01); *H04H 60/11* (2013.01); *H04H 60/12* (2013.01); *H04L 12/1868* (2013.01); *H04N 21/20* (2013.01); *H04N 21/23106* (2013.01); *H04N 21/24* (2013.01); *H04N 21/41407* (2013.01); *H04N 21/442* (2013.01); *H04N 21/44209* (2013.01); *H04N 21/6581* (2013.01);
(Continued)

(58) Field of Classification Search
None
See application file for complete search history.

(56) References Cited

U.S. PATENT DOCUMENTS 7,017,174 B1 * 3/2006 Sheedy ........................ 725/87
7,036,138 B1 * 4/2006 Tash .............................. 725/46
(Continued)

FOREIGN PATENT DOCUMENTS

CN        1631020 A      6/2005
EP        1 931 112 A1   6/2008
(Continued)

OTHER PUBLICATIONS

Official Communication from the Korean Patent Office, Notification for Filing Opinion in Korean Patent Application 10-2008-0075442, mailed Dec. 2, 2009, and English language translation (8 pages total).

(Continued)

*Primary Examiner* — Justin Shepard
(74) *Attorney, Agent, or Firm* — Finnegan, Henderson, Farabow, Garrett & Dunner, LLP

(57) ABSTRACT

It is assumed that a reception processing unit receives a broadcast program in accordance with tuning based on the user's specification. In this state, a non-viewable state detection processing unit monitors occurrence of a non-viewable state from an acquisition state of reception data. When the non-viewable state occurs due to a certain factor, a non-viewable state accumulation unit accumulates information on the non-viewable state. When the factor of a viewing interruption is solved and a user makes a request for service provision, the processing unit connects to a distribution apparatus to report content of the non-viewable state, and receives distribution of a relevant content, thereby the processing unit becomes able to recontinue interrupted broadcast content.

4 Claims, 2 Drawing Sheets

(51) Int. Cl.
  *H04N 21/20* (2011.01)
  *H04N 21/442* (2011.01)
  *H04H 60/11* (2008.01)
  *H04H 60/12* (2008.01)
  *H04L 12/18* (2006.01)
  *H04N 21/414* (2011.01)
  *H04N 21/658* (2011.01)

(52) U.S. Cl.
  CPC ...... *H04N 21/6582* (2013.01); *H04H 2201/30* (2013.01); *H04L 12/189* (2013.01)

(56) References Cited

U.S. PATENT DOCUMENTS

| | | | |
|---|---|---|---|
| 7,962,011 B2 * | 6/2011 | Plourde et al. | 386/295 |
| 8,006,275 B1 * | 8/2011 | Poole et al. | 725/96 |
| 2007/0054613 A1 * | 3/2007 | Matsubara | 455/3.01 |
| 2007/0101394 A1 * | 5/2007 | Fu et al. | 725/134 |
| 2007/0183744 A1 | 8/2007 | Koizumi et al. | |
| 2008/0022294 A1 * | 1/2008 | Perrin et al. | 725/9 |
| 2008/0155628 A1 * | 6/2008 | Soukup et al. | 725/110 |

FOREIGN PATENT DOCUMENTS

| | | |
|---|---|---|
| JP | 2002-320156 | 10/2002 |
| JP | 2003-163918 | 6/2003 |
| JP | 2004-274562 | 9/2004 |
| JP | 2005-26914 | 1/2005 |
| JP | 2005-309924 | 11/2005 |
| JP | 2006-5770 | 1/2006 |
| JP | 2006-157759 | 6/2006 |
| JP | 2006-165934 | 6/2006 |
| KR | 2007-16277 | 2/2007 |
| WO | WO 98/31171 | 7/1998 |
| WO | WO 2005/057928 A1 | 6/2005 |

OTHER PUBLICATIONS

Official Communication from the Chinese Patent Office, Notification of First Office Action in Chinese Patent Application No. 200810145203.4, mailed Apr. 14, 2010 (3 pages) and an English language translation (6 pages).

Combined Search and Examination Report issued by the United Kingdom Intellectual Property Office on Nov. 18, 2008, for Great Britain Application No. GB0814235.8.

Official Communication from the Japanese Patent Office, Notice of Reasons for Rejection in Japanese Patent Application No. 2007-241491, mailed Jul. 28, 2009, and English language translation (6 pages total).

Notification for Filing Opinion issued by the Korean Patent Office in Korean Patent Application No. 10-2008-0075442, mailed Aug. 30, 2010 (4 pages) and an English language translation (7 pages).

First Office Action issued by the Japanese Patent Office in Japanese Patent Application No. 2010-142895, mailed Feb. 19, 2013 and an English language translation.

First Office Action Issued by the Japanese Patent Office on Jun. 25, 2013, for Japanese Patent Application No. 2010-142895, and English-language translation thereof.

\* cited by examiner

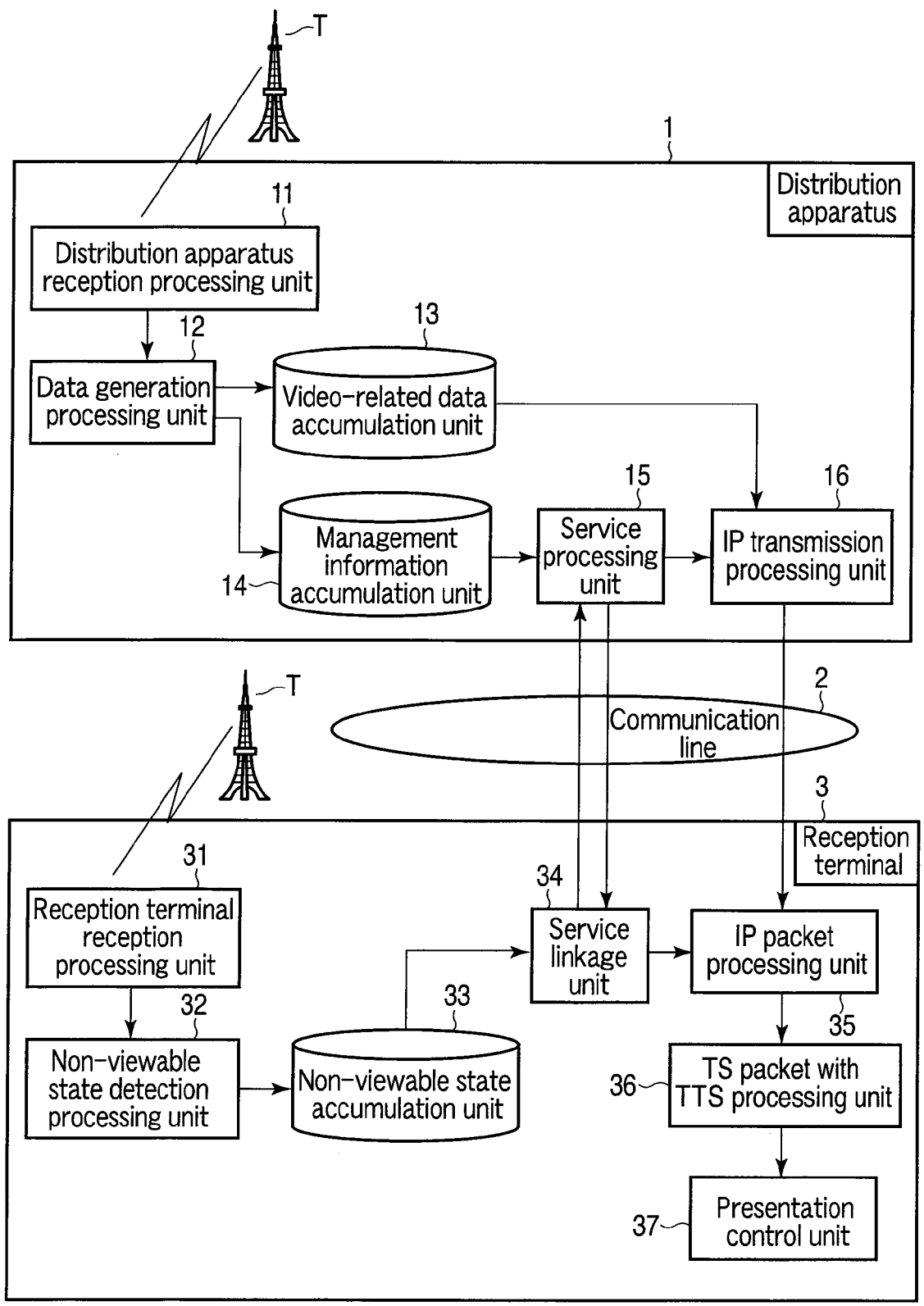
F I G. 1

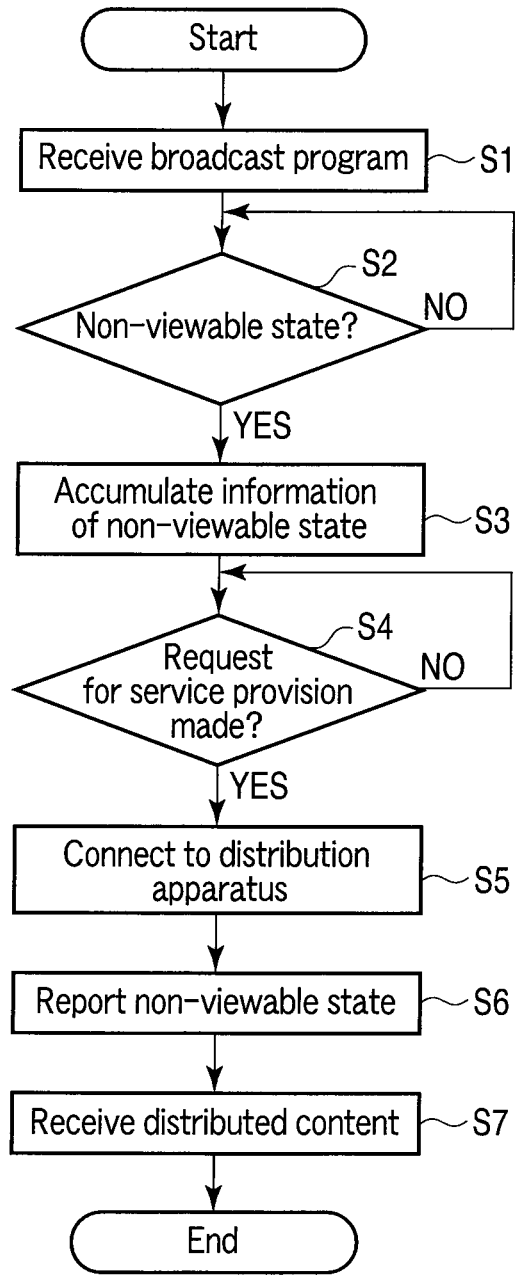
F I G. 2

BROADCAST CONTENT DISTRIBUTION SYSTEM, AND DISTRIBUTION APPARATUS AND BROADCAST RECEPTION TERMINAL DEVICE FOR USE IN THE SYSTEM

CROSS-REFERENCE TO RELATED APPLICATIONS

This application is based upon and claims the benefit of priority from prior Japanese Patent Application No. 2007-241491, filed Sep. 18, 2007, the entire contents of which are incorporated herein by reference.

BACKGROUND OF THE INVENTION

1. Field of the Invention

The present invention relates to a broadcast content distribution system which re-distributes broadcast content to broadcast reception terminals for a digital broadcast, and a distribution apparatus and a broadcast reception terminal device for use in the system.

2. Description of the Related Art

Recently, digitization of a broadcast through a radio wave has progressed, and reception of content of video-related data by means of a mobile reception terminal such as a portable terminal and a terminal with a mobile object mounted thereon has become widespread. Depending on the spread of broadband, Internet Protocol (IP) broadcasting and a video on demand (VOD) service using a communication line have become widely used. Meanwhile, a service which distributes TS packets used for the conventional terrestrial digital broadcast, etc., by using the communication line has become realized.

It should be noted that during the viewing of a digital broadcast program by the mobile reception terminal, when the mobile reception terminal moves to a place where the terminal cannot receive radio waves, or when a situation where a battery becomes dead, the terminal is brought into a situation in which it cannot receive the program which has been viewed till then. Against such interruption, conventionally, there is no countermeasure to recontinue the program from the interrupted part, and a user has to wait the rerun later even if the reception terminal returns to a viewable state.

A system, in which TS packets in a broadcast for a mobile object received and demodulated by a digital broadcast reception device is retransmitted indoors and received by the mobile reception terminal so that the digital broadcast program can be viewed while the terminal moves indoors, is disclosed in Jpn. Pat. Appln. KOKAI Publication No. 2006-165934. A digital broadcast reception device, which receives an electronic program table from a cellular phone base station and switches to a channel providing the same broadcast program as that of in the former reception region on the basis of an electronic program table by receiving the electronic program table from a cellular phone base station in a case where the viewing of the program becomes impossible due to a change in reception region of a terrestrial digital broadcast caused by movement of a cellular phone terminal in the cellular phone terminal which can receive the terrestrial digital broadcast, is disclosed in Jpn. Pat. Appln. KOKAI Publication No. 2005-026914. However, these patent documents do not disclose a technique for recontinuing the broadcast program from the interrupted part during viewing.

As mentioned above, in conventional systems, there is no countermeasure for recontinuing the program from the interrupted part against the interruption by which the program which has been viewed becomes suddenly non-viewable during the viewing of the digital broadcast program, and the user has to wait for the rerun later.

BRIEF SUMMARY OF THE INVENTION

An object of the invention is to provide a broadcast distribution system configured to recontinue at least from an interrupted part of a digital broadcast which has been interrupted during viewing, and a distribution apparatus and a broadcast reception terminal for use in the distribution system.

According to the present invention, there is provided a broadcast distribution system, comprising: a distribution apparatus which acquires broadcast data, generates broadcast content from the broadcast data and management information for managing through at least time information by analyzing the broadcast content to accumulate the broadcast content and the management information, determines propriety of distribution on the basis of a content distribution request for the broadcast data and of condition information, and distributes a relevant broadcast content to a request origin when a condition is satisfied; and a broadcast reception terminal device which accumulates information of a non-viewable state when the non-viewable state occurs due to occurrence of an interruption during viewing of the broadcast content of the broadcast data, connects to the distribution apparatus to present the content distribution request and the condition information when recontinuation of interrupted broadcast content is requested, and receives the broadcast content to be distributed from the distribution apparatus to present the broadcast content at least from an interrupted part when the content distribution request coincides with the condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram depicting a configuration of one embodiment of a broadcast content distribution system regarding the invention; and FIG. 2 is a flowchart depicting processing at a reception terminal in the distribution system depicted in FIG. 1.

DETAILED DESCRIPTION OF THE INVENTION

Hereinafter, embodiments of the invention will be described in detail with reference to the drawings.

FIG. 1 is a block diagram illustrating one embodiment of a broadcast content distribution system regarding the invention. The system shown in FIG. 1 is composed of a broadcast content distribution apparatus 1, and a reception terminal 3 to be connected with the distribution apparatus 1 via a communication line 2.

In the distribution apparatus 1, a distribution apparatus reception processing unit 11 receives to demodulate broadcast data to be transmitted from a broadcast transmitting station T or broadcast data to be transmitted via a communication line, generates broadcast transport stream (TS) packets, and sends the TS packets to a data generation processing unit 12.

After adding a time stamp (hereinafter referred to as TTS) of 4 bytes corresponding to a reception time to the TS packets from the reception processing unit 11, the generation processing unit 12 eliminates packets of NULL, etc., which is unnecessary for a service, and stores the TS packets in a video-related data accumulate unit 13 as video-related data. The TTS is generated by a clock of 27 MHz, and the added TS is referred to as a partial TS.

The generation processing unit 12 analyzes the broadcast TS acquired from the reception processing unit 11, or the broadcast TS packets with the TTS added thereto, or the broadcast TS packets with the TTS added thereto and with the NULL, etc., unnecessary for the service eliminated therefrom, acquires titles, outlines, and time range information showing start times and end times of programs, generates program range information showing start and end positions of data to be stored in the video-related data accumulation unit 13, and stores the program range information in a management information accumulation unit 14 in a form making a connection with the video-related data.

Here, in acquiring titles, outlines and time range information of programs, it is preferable to utilize an event information table (EIT) in the broadcast TS packets. Other than this, the distribution system may generate management information from information of a network ID table (NIT), a broadcaster information table (BIT) and a service description table (SDT) in the broadcast TS packets if necessary.

In the distribution apparatus 1, a service processing unit 15 receives an authentication request and a data request from a service linkage unit 34 of the reception terminal 3 via the communication line 2. When the distribution apparatus 1 can be authenticated as a service providing registered object, the distribution apparatus 1 receives at least information of a time at which data reception to be added to the data request becomes impossible, checks the information of the time with information stored in a management information accumulation unit 14 on the basis of the information of the time, and determines whether or not data viewing becomes non-viewable. If it is surely determined that the required reception terminal cannot view the program, the service processing unit 15 reports that the program is viewable to the reception terminal 2, sends IP transmission-related information to the reception terminal 3 and performs a transmission request for the video-related data to be an object to an IP transmission processing unit 16.

The service processing unit 15 may report that the viewing is enabled to the reception terminal 3, and after receiving the viewing request from the reception terminal 3, may transmit the IP transmission-related information to the reception terminal 3 to issue a transmission request to the IP transmission processing unit 16. Further, the service processing unit 15 may transmit the IP transmission-related information and separately receive the IP transmission request from the reception terminal 3.

Meanwhile, in a reception terminal 3, a reception terminal reception processing unit 31 receives to demodulate broadcast data to be transmitted by a broadcast wave from the broadcast transmitting station T, or broadcast data to be transferred via a communication line, and generates to transmit broadcast TS packets to a presentation unit (not shown). The presentation unit extracts the video-related data from the broadcast TS packets to decode it, and presents the decoded data in the form of video and audio.

A reception situation of the reception processing unit 31 is monitored by a non-viewable state detection processing unit 32. That is, the detection processing unit 32 monitors the presence or absence of the data at the reception processing unit 31, generates information of a time in which the data reception becomes impossible, information of a time at which the data reception becomes enabled, and data information to be viewed, and stored such items of information in a non-viewable state accumulation unit 33. In a case where the data information to be object is generated, the NIT, BIT, DST, EIT packets, etc., in the broadcast TS packets may be utilized. It is assumed that the aforementioned non-viewable state also includes a case in which reception is interrupted because it suddenly becomes impossible for the user side to view the broadcast data other than the case in which the it becomes impossible to view the broadcast data because the broadcast data becomes actually impossible to be received, or because an error occurs in the broadcast data.

After interruption occurs due to the impossibility of viewing, when the user requests recontinuation, the service linkage unit 34 receives the viewing request, and acquires the data information to be object from the accumulation unit 33. After displaying a list of the data information, the linkage unit 34 specifies the video-related data to be object by selecting viewing, or selecting viewing depending on time zones, and issues the viewing request to the service processing unit 15 of the distribution apparatus 1 via the communication line 2. At this moment, the linkage unit 34 sends the data reception impossible time information, data receivable time information, and the data information to be viewed stored in the accumulation unit 33 to the distribution apparatus 1. The linkage unit 34 may transmit the information of the time when the viewing becomes impossible, etc., and may acquire the program data of viewable object. The linkage unit 34 may send the information of a time at which the viewing becomes impossible, etc., to the distribution apparatus 1, and may acquire to select the program data that is a viewable object.

In response to the viewing request from the service linkage unit 34, when the IP packets are transmitted from the IP transmission processing unit 16 of the distribution apparatus 1 via the communication network 2, in the reception terminal 3, the IP packets processing unit 35 accepts the video-related data to be transmitted via the communication line 2 from the distribution apparatus 1, performs an order correction of IP packets, performs data recovery of a packet missing correction, and generates TS packet data with TTS.

A TS packet with TTS processing unit 36 acquires TS packet data with TTS from the IP packet processing unit 35, and reproduces TS packets on the basis of the TTS information. A presentation processing unit 37 acquires TS packets from the packet processing unit 35, issues the TS packets to a presentation device (not shown) such as a display. In this case, if the video data is encrypted, the packet processing unit 36 decrypts the video data. In a case in which the video data to be viewed is encrypted and key information for decrypting the video data encrypted in the IP transmission-related information acquired by the service linkage unit 34, the packet processing unit 36 may acquire the key information to decrypt the video data.

In the configuration given above, hereinafter, a flow of a series of processing will be described.

When acquiring the broadcast data to be an object of a service, the distribution apparatus 1 firstly generates the video-related data and management information from the broadcast data by means of the data generation processing unit 12, and accumulates them in the video-related data accumulation unit 13 and the management information accumulation unit 14, respectively. When receiving a request for service provision and its non-viewable state information from the reception terminal 3, the distribution apparatus 1 determines relevant video-related data by referring to the management information accumulation unit 14, reads the video-related data from the accumulation unit 13, and sends the video-related data to the reception terminal 3 that is a request origin from the IP transmission processing unit 16.

Meanwhile, the reception processing in the reception terminal 3 is shown in FIG. 2. Firstly, it is assumed that the reception processing unit 31 receives the broadcast program by tuning from user's specification (Step Si). In this state, the non-viewable state detection processing unit 32 monitors whether or not the occurrence of a non-viewable state from a situation of acquisition of the reception data (Step S2). If the non-viewable state occurs due to a certain factor, the information on the non-viewable state is accumulated in the accumulation unit 33 (Step S3). When the factor of the viewing interruption is solved, and when the user made a service provision request (Step S4), the reception terminal 3 is connected to the distribution apparatus 1 (Step S5), and the reception terminal 3 reports content of the non-viewable state (Step S6). The reception terminal 3 receives the distribution of a relevant content to perform reception processing (Step S7) then the reception terminal 3 becomes able to recontinue the interrupted broadcast content.

That is, the broadcast content distribution system depending on the aforementioned configuration includes the distribution apparatus 1 by which the system obtains the TS packets used in broadcast, etc., generates the video-related data and the management information associated with the video-related data to accumulate them, determines that the reception terminal 3 of the portable terminal, etc., is brought into a non-viewable state of the video-related data, and distribute the accumulated video-related data by the use of the communication line 2, and includes the reception terminal 3. Thereby, the user can recontinue the program by using the communication line 2 and improve the convenience even when the user is inconvenienced by not being able to view the video-related data in a certain circumstance such as a radio wave is interrupted and a sudden visit of a guest during the viewing of the program.

Therefore, according to the broadcast content distribution system in the configuration given above, the reception terminal side may receive distribution of the broadcast content corresponding to the interruption time point in recovering even if the viewing is subjected to be brought into a situation of interruption of the viewing due to a certain reason, and the convenience may be improved.

It is our intention that the invention is not limited to the specific details and representative embodiments shown and described herein, for example, distribution of music data, character data other than the broadcast data may be embodied similarly, and in an implementation phase, this invention may be embodied in various forms without departing from the spirit or scope of the general inventive concept thereof. Various types of the invention can be forms by appropriately combining a plurality of constituent elements disclosed in the foregoing embodiments. Some of the elements, for example, may be omitted from all the constituent elements shown in the embodiments mentioned above. Further, the constituent embodiments over different embodiments may be appropriately combined.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A broadcast content distribution system, comprising:
a distribution apparatus which:
receives broadcast data over a broadcast network;
demodulates the received broadcast data to generate broadcast transport stream packets;
eliminates unnecessary packets from the broadcast transport stream packets to generate video-related data for a mobile terminal;
acquires time information to be provided by analyzing the broadcast transport stream packets;
generates program management information based on the provided time information;
accumulates the video-related data and the program management information;
accepts an individualized request to deliver video-related data of a designated program which has been sent through a network and impossible time information which indicates that data reception becomes impossible;
determines whether or not data viewing becomes non-viewable by checking the impossible time information with the program management information;
selects, when it is determined that data viewing becomes non-viewable, the whole video-related data of the requested program from accumulated video-related data; and
distributes IP packets into which the selected whole video-related data is converted to a request origin;
a mobile broadcast reception terminal device which:
receives broadcast data over a broadcast network from a broadcast transmitting station and IP packets over a IP network;
reproduces a program included in the broadcast data;
monitors presence or absence of the data reception to generate the impossible time information;
accumulates the generated impossible time information;
accepts a request to play interrupted data;
accesses the distribution apparatus over the IP network;
transmits a request for distribution of the interrupted data and the accumulated impossible time information;
receives the IP packets for the requested data;
generates broadcast transport stream packets based on the received IP packets; and
decodes the broadcast transport stream packets to reproduce the interrupted content from at least an interrupted point.

2. The broadcast content distribution system according to claim 1, wherein the distribution apparatus adds a time stamp to the broadcast transport stream packets, and generate the program management information manages the broadcast transport stream packets on the basis of time stamp.

3. A distribution apparatus for use in a broadcast content distribution system for distributing broadcast content of a broadcasted program to a mobile broadcast reception terminal device, comprising:
a reception processing unit which receives broadcast data over a broadcast network, and demodulates the received broadcast data to generate broadcast transport stream packets;
a data generation processing unit which:

eliminates unnecessary packets from the broadcast transport stream packets to generate video-related data for a mobile terminal;

analyzes the broadcast transport stream packets to acquire time information; and generates program management information based on the acquired time information;

an accumulation unit which accumulates the video-related data and the program management information;

a service processing unit which:

accepts an individualized request to deliver video-related data of a designated program which has been sent through the broadcast network and impossible time information which indicates that data reception becomes impossible;

determines whether or not data viewing becomes non-viewable by checking the impossible time information with the program management information; and selects, in response to a determination that data viewing becomes non-viewable, the whole video-related data of the requested program from accumulated video-related data; and an IP transmission processing unit which distributes IP packets into which the selected whole video-related data is converted to a request origin.

4. The distribution apparatus according to claim 3, wherein the data generation processing unit adds a time stamp to the broadcast transport stream packets, and generates the program management information for managing the broadcast transport stream packets on the basis of the time stamp.

* * * * *

UNITED STATES PATENT AND TRADEMARK OFFICE
CERTIFICATE OF CORRECTION

| | | |
|---|---|---|
| PATENT NO. | : 9,288,443 B2 | Page 1 of 1 |
| APPLICATION NO. | : 12/185424 | |
| DATED | : March 15, 2016 | |
| INVENTOR(S) | : Kurihara et al. | |

It is certified that error appears in the above-identified patent and that said Letters Patent is hereby corrected as shown below:

In the claims,

Claim 2, column 6, lines 56-57, "and generate the program management information manages the broadcast transport stream packets" should read -- and generates the program management information for managing the broadcast transport stream packets --.

Signed and Sealed this
Twenty-third Day of August, 2016

Michelle K. Lee
*Director of the United States Patent and Trademark Office*